Sept. 26, 1950  C. E. G. BAILEY  2,523,895
RADIO NAVIGATIONAL AID
Filed Feb. 27, 1948
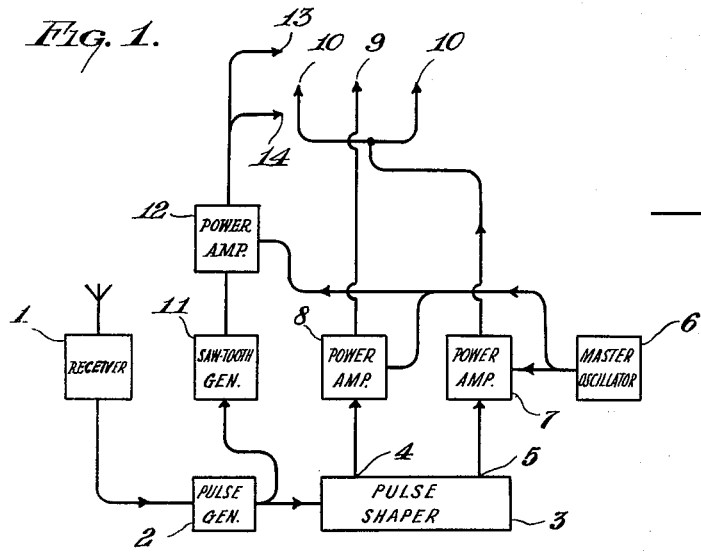
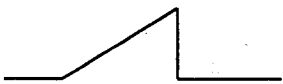
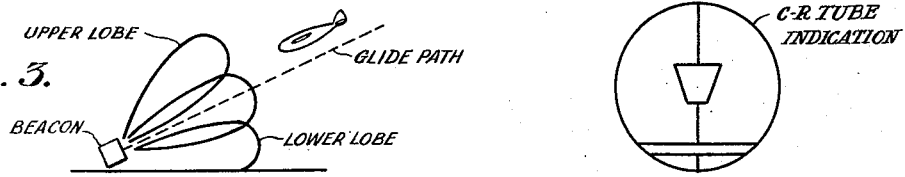
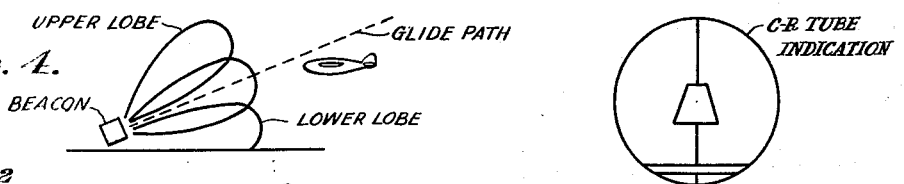
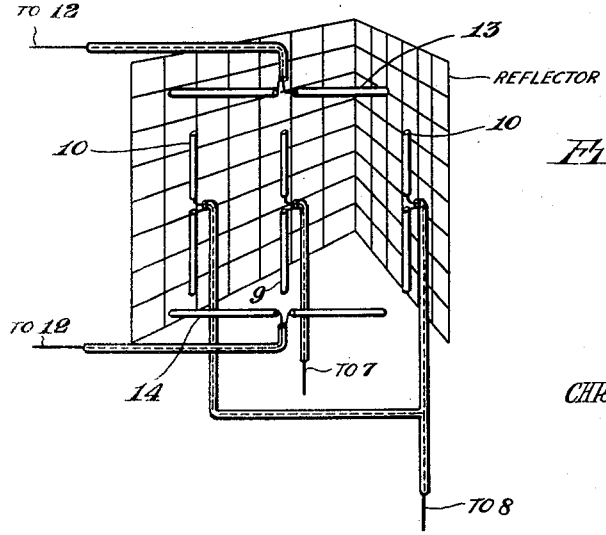
CHRISTOPHER EDMUND GERVASE BAILEY
INVENTOR.
BY
ATTORNEY.

Patented Sept. 26, 1950

2,523,895

UNITED STATES PATENT OFFICE 2,523,895

RADIO NAVIGATIONAL AID

Christopher Edmund Gervase Bailey, London, England, assignor to The Hartford National Bank and Trust Company, Hartford, Conn., as trustees Application February 27, 1948, Serial No. 11,517
In Great Britain November 16, 1944

Section 1, Public Law 690, August 8, 1946
Patent expires November 16, 1964

4 Claims. (Cl. 343—108)

This invention relates to radio-navigational aids for aircraft.

Various systems, such as that described in British patent specification No. 580,985 and in U. S. Patent 2,438,987 have been proposed to afford the pilot of an aircraft complete lateral guidance by apprising him of any deviations in the position or attitude of the aircraft from flight in a predetermined vertical plane (the approach plane) directed towards a predetermined point. Such systems however do not afford vertical guidance.

The primary object of the present invention is to provide means for affording this vertical guidance, i. e. for apprising the pilot of an aircraft of any departure of the aircraft from flight along a predetermined glide-path. In combination with a system such as that according to British patent specification No. 580,985, the present invention will provide an indication to a pilot of any departure from flight along the predetermined glide-path in the predetermined approach plane.

A further object of this invention is to provide an easily interpreted indication to the pilot of an aircraft in the form of a pattern on a cathode-ray tube.

The radio beacon system according to the present invention for indicating the vertical position of a vehicle with reference to a predetermined surface comprises at least one aerial system the radiation pattern of which extends above and below the said surface and at least one other aerial system the radiation pattern of which exhibits a minimum in the said surface and a reversal of phase on either side of the said surface and a reversal of phase on either side of the said surface, the radiation from the one aerial system or set of aerial systems being modulated by a train of pulses of one shape while the radiation from the other is modulated by a train of pulses of different shape.

The invention will now be described more fully with reference to one embodiment thereof illustrated in the accompanying drawing, in which—

Figure 1 shows a beacon in which glide-path indication is combined with approach plane indication according to British patent specification No. 580,985.

Figure 2 shows a waveform with reference to which the invention will be explained hereafter, and Figures 3 and 4 show indications which may be obtained on a cathode-ray tube related to the position of an aircraft with reference to the predetermined surface defined by the beacon.

Fig. 5 illustrates the antenna structure employed in connection with the navigation system shown in Fig. 1.

Referring to Figure 1, a receiver 1 is adapted to receive, amplify and detect a first series of pulses of radio waves radiated from a transmitter carried in an aircraft. The output from the receiver 1 triggers a pulse generator 2 producing pulses with a rapid rise and slow decay which is connected to a pulse shaper 3 from which emerge two pulses, a long and a short: the long pulse starts before and finishes after the short pulse. This pulse shaper consists of a length of artificial line, one end of which is connected to the pulse generator while the other, remote end is short-circuited. The long-pulse output is taken from the line at a point 4 close to the generator, while the short-pulse output is taken from a point 5 nearer the remote end. The incident pulse arrives first at the long-pulse output, then at the short-pulse output. Subsequently it is reflected, and the reflected pulse approximately annuls first the short-pulse output and then the long-pulse output.

The radio-frequency component of the transmitter output is generated by a master-oscillator 6, which drives two power amplifiers 7, 8 (inner power amplifier 7, outer power amplifier 8). The inner power amplifier 7 is keyed by the long pulses from the pulse shaper 3 and as shown in Fig. 5 feeds an "inner" dipole 9 placed centrally in a corner reflector. The outer power amplifier 8 is keyed by the short-pulses, and feeds a pair of "outer" dipoles 10 in opposite phases. The outer dipoles 10 are equally spaced about the inner dipole 9 in the plane through it at right angles to the plane bisecting the corner reflector.

The output from the pulse generator 2 is also supplied to a saw-tooth generator 11 which produces saw-tooth pulses of the form shown in Figure 2, the duration of each saw-tooth pulse being equal to that of the long-pulse output from the pulse shaper 3. The saw-tooth pulses are applied to key a glide path power amplifier 12 which is driven, similarly to the inner and outer power amplifiers 7, 8, by the master oscillator 6. The output of the glide path power amplifier 12 is fed to an aerial system comprising two dipoles 13, 14, fed in phase opposition with equal currents. The dipoles 13 and 14 are equally spaced above and below the approach plane beacon dipoles and surrounded by the approach plane beacon corner reflector.

The approach plane beacon system is utilised to provide a radiation system giving a radiation pattern extending above and below the predetermined glide path surface and the aerial system 13 and 14 provides a radiation pattern with a minimum along the predetermined surface and phase reversal on either side thereof since the dipoles 13 and 14 are fed equally and in opposition. The whole assembly is tilted at an angle corresponding to the glide path angle so that the plane about which phase reversal is exhibited cuts the approach plane in the desired glide path. The phase of the current feeding the dipoles is adjusted so that at a distance in the approach plane the radiation from the dipoles 13, 14 is in phase with that from the approach plane beacon above the glide path and in antiphase below the glide path.

The resulting indications of the cathode-ray tube of an aircraft receiver arranged as described in British patent specification No. 580,985 are as shown in Figure 3 when the aircraft is above the glide path, and as shown in Figure 4 when the aircraft is below the glide path. These indications are especially easy to interpret as they are roughly in the shape of an arrow head pointing in the direction of the glide path. Figures 3 and 4 also indicate the positions of the aircraft and the radiation patterns of the glide path beacon in relation to the glide path and in relation to the indications provided on the cathode-ray tube.

In a combined approach plane and glide path radio-navigational aid system as described above, the indications of attitude, lateral deviation and distance furnished by the approach plane beacon are unaffected by the present invention, the indications furnished by the approach plane beacon being combined with those of the glide path beacon, the indications shown in Figures 3 and 4 being those provided when the aircraft is in the approach plane.

In a further modification according to the invention, such adjustment may be made automatically by means controllable from the aircraft, e. g. by the length of the pulses emitted by the aircraft's transmitter, or by the character of some ancillary signal emitted from the aircraft.

In order to diminish the effect of waves reflected from the ground or from objects thereon, auxiliary reflectors may be added or highly directive devices such as paraboloidal mirrors utilised to minimise radiation below a certain angle. In the latter case it may be convenient to use a frequency much higher than that envisaged in British patent specification No. 580,985 (i. e. much higher than 220 mc./sec.).

If, however, the wavelength preferred for the system is such that highly directive devices cannot be conveniently constructed to minimise radiation capable of being reflected from the ground, the reflecting properties of the latter may be utilised to obtain the necessary approach and glide path beams.

The approach beacon emission, modulated by square pulses may then be arranged to radiate towards the aircraft directly and also indirectly after reflection from the ground. These two radiations will, as is well known, approximately cancel in a certain surface; the approach beacon aerial system is, however, arranged close enough to the ground to ensure that this surface lies well above the glide path.

The glide path emission, modulated as described by saw-tooth pulses, also radiates in this case directly and indirectly to the aircraft; the aerial system used for this is, however, spaced further from the ground at such a height that the minimum coincides with the desired glide path.

I claim:

1. In a system for radio navigation, a receiver for a wave modulated by a first set of pulses, means coupled to said receiver and responsive to said first set of pulses to generate second, third and fourth sets of pulses, said second and third sets of pulses having a rectangular shape, said fourth set of pulses having a saw tooth shape, the pulses of said third set occurring during the duration of the pulses of said second set and having a duration less than the duration of the pulses of said second set, the pulses of said fourth set having a duration equal to that of the second set, means to generate a first radio frequency wave modulated in accordance with the amplitude variations of the pulses of said second set, means to generate a second radio frequency wave modulated in accordance with the pulses of said third set, means to generate a third radio frequency wave modulated in accordance with the amplitude variations of the pulses in said fourth set, antenna means to radiate said first modulated radio frequency wave in a given glide path direction to provide maximum radiation in the vertical plane passing through said direction, antenna means to radiate said second modulated radio frequency wave in a plane perpendicular to said vertical plane and having a null in said vertical plane and a reversal of directional phase on either side of said null, and antenna means to radiate said third modulated radio frequency wave in said vertical plane and having a null in the glide path direction lying within said vertical plane and a reversal of directional phase on either side of said null.

2. In a system for radio navigation a receiver for a wave modulated by a first set of pulses, an artificial line coupled to said receiver and responsive to said first set of pulses to generate second and third sets of pulses, said second and third sets of pulses having a rectangular shape, a saw tooth generator coupled to said receiver and responsive to said first set of pulses to generate a fourth set of pulses, the pulses of said third set occurring during the duration of the pulses of said second set and having a duration less than the duration of the pulses of said second set, the pulses of said fourth set having a duration equal to that of said second set, means to generate a first radio frequency wave modulated in accordance with the amplitude variations of the pulses of said second set, means to generate a second radio frequency wave modulated in accordance with the pulses of said third set, means to generate a third radio frequency wave modulated in accordance with the amplitude variations of the pulses in said fourth set, antenna means to radiate said first modulated radio frequency wave in a given glide path direction to provide maximum radiation in the vertical plane passing through said direction, antenna means to radiate said second modulated radio frequency wave in a plane perpendicular to said vertical plane and having a null in said vertical plane and a reversal of phase on either side of said null, and antenna means to radiate said third modulated radio frequency wave in said vertical plane and having a null in the glide path direction lying within said vertical plane and a reversal of directional phase on either side of said null.

3. A system for radio navigation a receiver for a wave modulated by a first set of pulses, means coupled to said receiver and responsive to said first set of pulses to generate second, third and fourth sets of pulses, said second and third sets of pulses having a rectangular shape, said fourth set of pulses having a saw tooth shape, the pulses of said third set occurring during the duration of the pulses of said second set and having a duration less than the duration of the pulses of said second set, the pulses of said fourth set having a duration equal to that of said second set, a master oscillator, means to derive from said oscillator a first radio frequency wave modulated in accordance with the amplitude variations of the pulses of said second set, means to derive from said oscillator a second radio frequency wave modulated in accordance with the pulses of said third set, means to derive from said master oscillator a third radio frequency wave modulated in accordance with the amplitude variations of the pulses in said fourth set, antenna means to radiate said first modulated radio frequency wave in a given glide path direction to provide maximum radiation in the vertical plane passing through said direction, antenna means to radiate said second modulated radio frequency wave in a plane perpendicular to said vertical plane and having a null in said vertical plane and a reversal of directional phase on either side of said null, and antenna means to radiate said third modulated radio frequency wave in said vertical plane and having a null in the glide path direction lying within said vertical plane and a reversal of directional phase on either side of said null.

4. In a system for radio navigation, a receiver for a wave modulated by a first set of pulses, means coupled to said receiver and responsive to said first set of pulses to generate second, third and fourth sets of pulses, said second and third sets of pulses having a rectangular shape, said fourth set of pulses having a saw tooth shape, the pulses of said third set occurring during the duration of the pulses of said second set and having a duration less than the duration of the pulses of said second set, the pulses of said fourth set having a duration equal to that of said second set, means to generate a first radio frequency wave modulated in accordance with the amplitude variations of the pulses of said second set, means to generate a second radio frequency wave modulated in accordance with the pulses of said third set, means to generate a third radio frequency wave modulated in accordance with the amplitude variations of the pulses in said fourth set, a corner reflector, a central dipole within said reflector to radiate said first modulated radio frequency wave in a given glide path direction to provide maximum radiation in the vertical plane passing through said direction, a first pair of dipoles within said reflector on either side of said central dipole to radiate said second modulated radio frequency wave in a plane perpendicular to said vertical plane and having a null in said vertical plane and a reversal of directional phase on either side of said null, and a second pair of dipoles within said reflector above and below said central dipole to radiate said third modulated radio frequency wave in said vertical plane and having a null in the glide path direction lying within said vertical plane and a reversal of directional phase on either side of said null.

CHRISTOPHER EDMUND GERVASE BAILEY.

REFERENCES CITED

The following references are of record in the file of this patent:

UNITED STATES PATENTS

| Number | Name | Date |
|---|---|---|
| 2,275,673 | Davies | Mar. 10, 1942 |
| 2,297,228 | Kramar | Sept. 29, 1942 |
| 2,307,023 | Cooke et al. | Jan. 5, 1943 |
| 2,347,180 | Granquist | Apr. 25, 1944 |
| 2,400,736 | Brown | May 21, 1946 |
| 2,408,779 | Jenks et al. | Oct. 8, 1946 |
| 2,438,987 | Bailey | Apr. 6, 1948 |
| 2,447,549 | Willoughby | Aug. 24, 1948 |
| 2,449,999 | Armstrong | Sept. 28, 1948 |